No. 737,054. PATENTED AUG. 25, 1903.
W. C. ANDERSON & C. F. FLEMING.
DEVICE FOR PRESSING FRUIT INTO BOXES.
APPLICATION FILED JAN. 20, 1903.
NO MODEL. 2 SHEETS—SHEET 2.
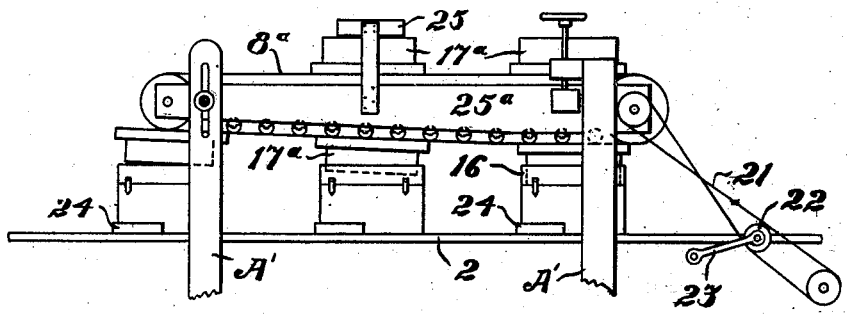
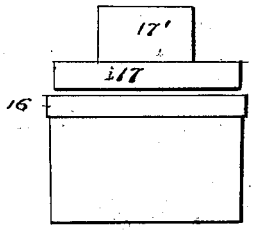
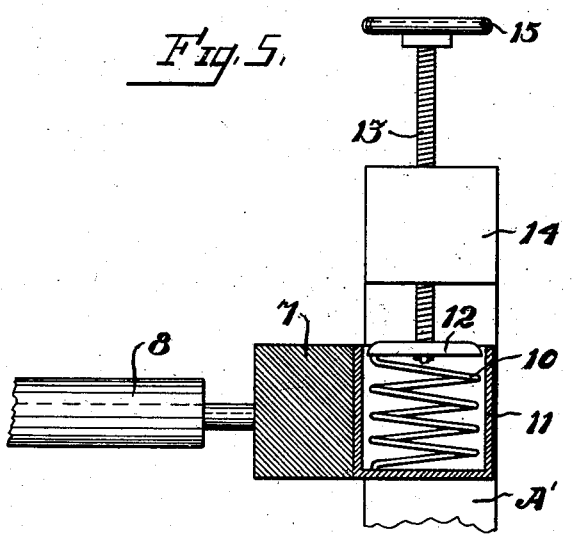

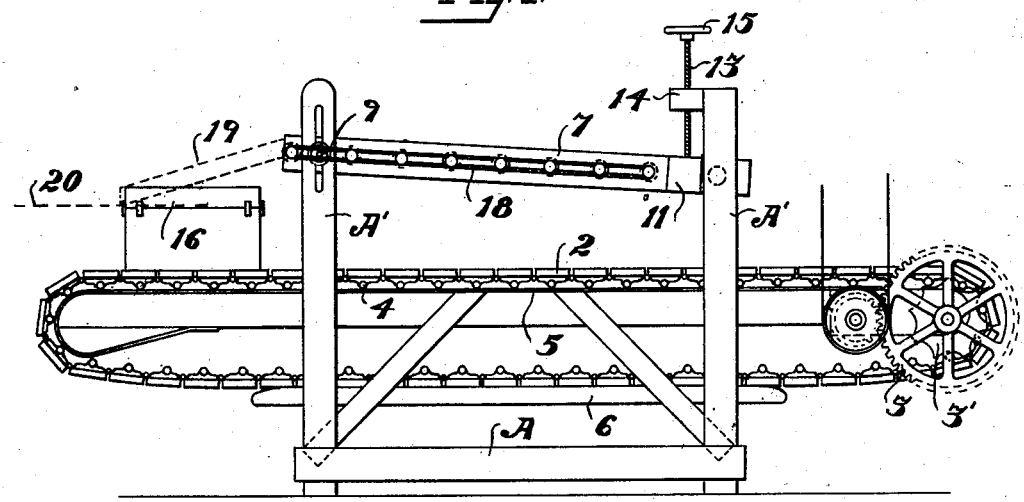
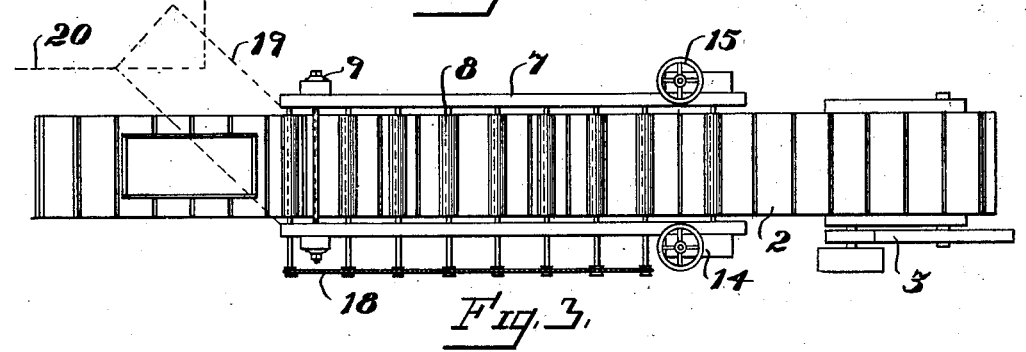
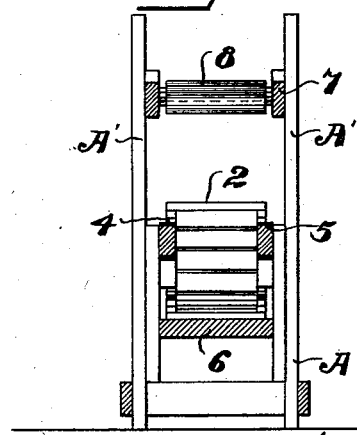

No. 737,054. Patented August 25, 1903.

UNITED STATES PATENT OFFICE.

WILLIAM C. ANDERSON AND CHARLES F. FLEMING, OF SAN JOSE, CALIFORNIA, ASSIGNORS TO ANDERSON BARNGROVER MFG. CO., OF SAN JOSE, CALIFORNIA, A CORPORATION.

DEVICE FOR PRESSING FRUIT INTO BOXES.

SPECIFICATION forming part of Letters Patent No. 737,054, dated August 25, 1903.

Application filed January 20, 1903. Serial No. 139,758. (No model.)

*To all whom it may concern:*

Be it known that we, WILLIAM C. ANDERSON and CHARLES F. FLEMING, citizens of the United States, residing at San Jose, county of Santa Clara, State of California, have invented an Improvement in Devices for Pressing Fruit into Boxes; and we hereby declare the following to be a full, clear, and exact description of the same.

Our invention relates to improvements in packing devices by which dried fruits and the like may be compressed into boxes.

The object of our invention is to provide a machine capable of pressing several thousand boxes of fruit in a day, that is uniform in its results, that does not mar the fruit, and that is adjustable for variation in filling and for different sizes of boxes or packages.

It consists, essentially, of a horizontal endless carrier upon which the boxes or other receptacles containing the fruit are conveyed, a superposed adjustable pressure-surface arranged and operating in relation to said carrier, and means for compressing the contents of the boxes as the latter are passed between said carrier and surface.

It also comprises details which will be more fully hereinafter set forth, having reference to the accompanying drawings, in which—

Figure 1 is a side elevation of our apparatus. Fig. 2 is a plan view of same. Fig. 3 is a transverse vertical section. Fig. 4 is a modification of same. Fig. 5 is a detail of spring and mechanism. Fig. 6 is a detail to be referred to.

A represents a suitable framework supporting the various parts of our device.

2 is an endless carrier or draper upon which the boxes or other receptacles containing the fruit are conveyed through the machine. Motion is transmitted to this carrier through any suitable gearing, as 3, and a sprocket 3', engaging a chain or equivalent mechanism on the carrier. This carrier is supported in its travel by means of rollers 4, running upon the tracks 5. The use of these rollers and track obviates the necessity of a drum at the end opposite from the driven end of the carrier. The latter is supported on its return movement upon the platform or guides 6.

Superposed above the carrier 2 is the pressure-surface, which is adapted to act upon a follower placed upon the previously-filled box and gradually to compress the contents of the latter as it passes along upon the conveyer. In Fig. 1 we have shown this pressure-surface as consisting of a frame 7, in which is journaled the rollers 8. One end of this frame is pivoted at 9 in a slot in the standards A' of the support. The other end of the frame 1 is resiliently supported, as by a spring 10, in the casing 11, secured to the frame, the upper end of this spring being secured to a plate 12, which latter is connected to a screw 13. This screw operates in a bracket, as 14, and may be turned by a small hand-wheel 15. Thus the frame can be adjusted to any size of box, and the spring 10 serves to relieve the contents from any excess of pressure.

In operation a hood, extension, or guide 16 is placed upon the box, as it is necessary always to fill the box with the loose fruit considerably above the top edge, to allow for the proper compression. As fruit is so graded and as the same amount by weight is always placed in a box, the variation in a particular "run" of certain-sized fruit and certain-sized box is very slight. Thus filled a follower 17, (see Fig. 6,) which just fits the interior of the box, is placed thereon. The follower is provided with a stem 17', which is adapted to engage the rollers as the box is carried forward upon the conveyer. The frame 7 is inclined in the direction of travel, so that a gradually-increasing pressure is exerted on the fruit, and when the box issues from beneath the rollers the fruit will be tightly and uniformly packed. No bruising will take place, as the spring will relieve any excess of pressure. As these pressure-frames are often ten or twelve feet in length and a constant stream of boxes is passing thereunder, it is desired to return the followers to the feed end of the machine after the process of compression is complete. For this purpose the rollers may be made to revolve continually by means of a rope 18, passing over sheaves on the ends of the roller-trunnions. The travel of the boxes on the carrier and the counter pressure of the followers on the lower side of the rollers will cause all of the latter to turn in unison. Having passed beneath the pressure-frame, the plungers are simply placed on the top thereof and are conveyed to the other end and deposited into an oiled or wetted trough or chute 19 and upon the table 20 ready for use again.

Where fruit similar to figs are packed in small boxes or cartons, it is usual to press these by means of devices similar to a letter-press. This is a tedious process and entirely inadequate to the handling of large quantities of fruits.

In Fig. 4 we have shown a modification of our machine whereby it is applicable for the purpose of pressing fruit into small receptacles and in which the operation of pressing and of returning the plungers is entirely automatic. This is done by simply transforming the pressure-frame into an endless draper or carrier and attaching the followers fixedly to the draper. $8^a$ represents a draper similar in construction and operation to the main conveyer 2 and receiving its power from the shaft of and revolving in unison with the latter. It is adjustably supported in the standards A', and any variation in the tension of the chain 21 by reason of this adjustment is compensated for by means of an idler 22. This idler is pivoted in a bracket 23, movable upon the main frame of the machine. The followers $17^a$ are suitably secured to the draper, so that they will bear down properly on the fruit as the boxes pass beneath. The track $25^a$, upon which the draper travels and against which it is supported during the process of pressing the fruit, is inclined for the greater portion of its length; but a portion near its lower end is horizontal, so that the stems of the followers may assume a vertical position and cause a final even pressure to be exerted over the whole surface of the fruit. The feeding of the boxes in relation to the followers is regulated by means of the recesses or guide-stops 24 upon the carrier 2. After each operation of pressing it is necessary to sponge off or otherwise thoroughly cleanse the face of the follower before it is again used in order to prevent the fruit sticking to it. Upon the frame of the draper $8^a$ are provided one or more surfaces 25, of felt or spongy material, which may be kept continually moist. As the followers come along their faces will rub against these surfaces and any particles of fruit will be wiped off. Thus it is seen that the filled box once placed in the recesses upon the carrier, the further operation of inserting the plungers, pressing the fruit, returning and cleansing the plungers is entirely automatic and permits of an immensely augmented amount of fruit to be handled over what is possible by means ordinarily in use.

Having thus described our invention, what we claim as new, and desire to secure by Letters Patent, is—

1. A device for pressing fruit consisting in combination of a horizontal endless carrier upon which the boxes containing the fruit to be pressed are conveyed, a superposed pressure-surface and followers adapted to fit in said boxes and to have a downward pressure exerted thereon by means of said superposed surface.

2. A device for pressing fruit consisting of a horizontal conveyer, a superposed pressure-frame pivoted at one end and arranged in relation to said conveyer, followers by which the fruit is pressed into boxes as the latter are passed between said conveyer and frame, and means by which said followers are returned to the feed end of the machine.

3. In a device for pressing fruit, the combination with a horizontal conveyer of a pressure-frame in line with and above said conveyer, said frame having its upper end pivotally secured and its lower end resiliently supported, said frame adapted to act upon followers and compress the fruit in the boxes as the latter are passed between the conveyer and frame.

4. In a device for pressing fruit, the combination of an endless carrier, rollers thereon, a track upon which said rollers travel and support said carrier, a superposed, inclined pressure-surface in relation to said carrier, and guides in which said surface is vertically adjustable.

5. In a device for pressing fruit the combination with a conveyer of a pressure-frame consisting of an endless carrier, followers fixed thereon, and means for driving said conveyer and carrier in unison.

6. A device for pressing fruit consisting in the combination of a horizontal endless conveyer, a superposed pressure-frame inclined in relation to said conveyer, said frame including an endless carrier, followers fixed thereon, surfaces with which the faces of said followers contact and by which they are cleansed, guides upon the above-mentioned conveyer arranged in relation to said followers, and means by which said conveyer and carrier are actuated in unison.

In witness whereof we have hereunto set our hands.

WILLIAM C. ANDERSON.
CHARLES F. FLEMING.

Witnesses:
CHAS. A. SMITH,
E. E. WORCESTER.